Patented Feb. 15, 1949

2,462,045

UNITED STATES PATENT OFFICE 2,462,045

METHOD OF PRODUCING FILTERS

John Wulff, Cambridge, Mass.

No Drawing. Application April 4, 1942,
Serial No. 437,693

5 Claims. (Cl. 148—4)

This invention relates to the production of filters or other foraminous elements of high thermal and chemical resistance.

The problem of filtration of finely divided solid materials from a gas or liquid is encountered in many technical fields. In certain of these fields in which high temperature and/or a corroding gas or liquid is involved the problem becomes acute because of the difficulty of obtaining a filter material which is sufficiently resistant. For example, filtration of finely divided catalysts from hot hydrocarbon vapors or liquids produced by pyrolysis or cracking reactions is difficult to carry out economically. These reaction products pass through the filtration stage at such an elevated temperature that the filter medium must be highly resistant. For this purpose various resistant inorganic materials in filamentary form have been used. With this type of filter medium it is difficult to control the size of the interstitial spaces or pores with the result that the filtration is ineffective. In other fields such as in the removal of bag house products, dust and the like, difficult problems arise. In these operations the solid phase which is to be removed from the gas or vapor phase may be in such extremely finely divided form that it is practically impossible to use screens or similar solid foraminous material and resort is had to more expensive methods of separation such as electrostatic precipitation and the like.

The present invention relates to the production of an improved type of filter or diaphragm characterized by excellent physical properties and a very high resistance to heat and corrosion. A further notable characteristic of the improved type of filter is its controlled pore size. As will be seen the pore size of the novel products may be controlled within wide permissive limits so as to adapt the new filters for use for the separation of solid particles of widely varient sizes.

Considered briefly the invention comprehends the concept of producing heat and/or corrosion resistant filters by utilizing powdered metal alloys, such as 18–8 stainless steel, and the like, and forming such powders into compacted units of excellent physical properties having a porous structure in which the degree of porosity and the pore size is controlled within desirable restricted predetermined limits.

Within the broad scope of the invention a number of specifically different methods may be employed to produce the new products.

In one method such filter units may be produced by mixing stainless steel powder and copper, or equivalent metal powders of the desired particle size and ratio, as for example from 1% to 5% or more of copper powder with stainless steel powder. This mixture, which may be of any desired mesh size, and particle size distribution may then be placed in a steel container and sintered in situ, in dry hydrogen at a temperature and for a time sufficient to weld the mass into a coherent unit. This unit which may be a bar or ingot is then rolled to gauge. The additive porosity-producing element, copper, silver, lead or the like, is then removed by selective leaching or distillation thus producing a foraminous stainless steel unit of high heat and corrosion resistance and of the requisite pore size. Obviously though 18-chromium 8-nickel stainless steel is mentioned the invention contemplates the use of the whole range of stainless and heat resistant steels including the molybdenum bearing stainless steels and the like.

It will be appreciated that copper is merely one example of a porosity-producing agent. In lieu of copper the addition element may be any other metal, like silver, which can be selectively leached out of the stainless steel matrix or it may be a metal such as lead which can be removed from the filter by simple heat distillation.

In yet another method a plurality of foraminous units of the type described may be produced simultaneously. This method is especially advantageous for the production of units of standardized size. In this method a mixture of stainless steel powder and a porosity-producing element such as copper and the like is made up in the manner described. This mixture is then fed to a form or mould which comprises preferably a thin gauge iron or steel box which is provided with a series of uniformly spaced partitions such that the box is provided with one open end and is sub-divided by the partitions into a series of spaces or containers. The powder mixture is then fed into the box level or approximately level with the open end. The unit is then sintered in situ, in a dry hydrogen atmosphere and is subsequently hot rolled to secure any desired reduction.

The rolled unit is then subjected to the action of a suitable pickling solution, such as a solution of sulfuric acid of suitable concentration which preferentially dissolves the iron or steel container. Thereafter the separated stainless steel units may be subjected to a pickling solution which dissolves the porosity-imparting addition agent. As will be appreciated the dissolution of the iron or steel containers and laminations as well as the copper or other porosity-producing elements may be effected simultaneously by utilizing the proper pickling solution.

In this manner a series of sheets of foraminous material may be produced with a single annealing and rolling operation. This method also provides a simple expedient for producing either thick or relatively thin filtering units with no substantial warpage.

The improved foraminous elements may be produced by yet another method. According to this method stainless steel powder of the requisite particle size and distribution is sintered in an open boat or closed container at a sufficiently high temperature and for a sufficient period of time to produce a coherent although porous mass, as is explained, for example, in my copending application Serial No. 383,875, filed March 17, 1941 now Patent No. 2,407,862. The sintered unit is then dipped in molten copper so as to insure absorption of the copper into the pores of the unit. The unit is then hot rolled to gauge and the copper is subsequently removed by a suitable leaching agent. In this operation the ultimate thickness of the unit may be attained by a simple rolling operation without destroying or substantially reducing the porosity of the original sintered unit.

While preferred modifications of the invention have been described it is to be understood that these are given didactically to illustrate the underlying principles involved and not as limiting the useful scope of the invention to the particular illustrative embodiments.

I claim:

1. A method of producing corrosion resistant filters which comprises mixing stainless steel powder of predetermined particle size with copper powder of predetermined size, forming the powder into the desired shape by pressing the mixture in a die; sintering the resulting compact in a reducing atmosphere to cohere the stainless steel particles and then subjecting the product to the action of a solution which preferentially dissolves the copper.

2. A method of producing corrosion resistant filters which comprises admixing predetermined amounts of stainless steel powder and copper powder; sintering the mixture in a reducing atmosphere to cohere the stainless steel particles, hot rolling the unit to a sheet of the desired thickness and subjecting the sheet to the action of a solution which preferentially dissolves the copper.

3. A method of producing corrosion resistant filters which comprises admixing stainless steel powder of predetermined particle size with a different metallic powder which is readily dissolved, forming the powder mixture into the desired shape by pressing the mixture in a die; sintering the compact thus produced to cohere the stainless steel particles and to form a unitary product of high mechanical strength and subsequently removing said different metallic component.

4. A method of producing foraminous stainless steel sheets which comprises preparing a mixture of stainless steel powder and a readily corrodible metal powder; feeding the mixture into a laminated container, which container is constructed of corrodible metal; treating the filled container in a furnace under reducing conditions and sintering temperatures to cohere the stainless steel particles; hot rolling the unit to the desired gauge and then subjecting the unit to the action of a corroding solution to dissolve the container and the corrodible metal powder to produce a plurality of unitary porous stainless steel elements.

5. A method of producing foraminous stainless steel sheets which comprises preparing a mixture of stainless steel powder and copper powder, each of predetermined particle size, feeding the mixture into a laminated steel container; treating the filled container in a furnace under reducing conditions and sintering temperatures to cohere the stainless steel particles; hot rolling the unit to the desired gauge and then subjecting the unit to the action of a chemical solution to dissolve the container and the copper powder to produce a plurality of individual porous stainless steel elements.

JOHN WULFF.

REFERENCES CITED

The following references are of record in the file of this patent:

UNITED STATES PATENTS

| Number | Name | Date |
|---|---|---|
| 1,286,089 | Pfanstiehl | Nov. 26, 1918 |
| 1,292,535 | Sweetlord | Jan. 28, 1919 |
| 1,531,666 | Laise | Mar. 31, 1925 |
| 1,628,190 | Raney | May 10, 1927 |
| 1,689,030 | Holland | Oct. 23, 1928 |
| 1,922,038 | Hardy | Aug. 15, 1933 |
| 2,047,555 | Gardner | July 14, 1936 |
| 2,096,924 | Schwarzkopf | Oct. 26, 1937 |
| 2,122,053 | Burkhardt | June 28, 1938 |
| 2,157,596 | Davis | May 9, 1939 |
| 2,192,792 | Kurtz | Mar. 5, 1940 |
| 2,199,620 | Davis | May 7, 1940 |
| 2,212,162 | Littleton | Aug. 20, 1940 |
| 2,220,641 | Davis | Nov. 5, 1940 |
| 2,239,144 | Dean | Apr. 22, 1941 |

FOREIGN PATENTS

| Number | Country | Date |
|---|---|---|
| 194,355 | Great Britain | Mar. 12, 1923 |
| 714,058 | Germany | Oct. 30, 1941 |